United States Patent

Clifton et al.

Patent Number: 6,081,875
Date of Patent: Jun. 27, 2000

[54] APPARATUS AND METHOD FOR BACKUP OF A DISK STORAGE SYSTEM

[75] Inventors: Richard J. Clifton, Cary; Sanjoy Chatterjee, Raleigh; John P. Larson, Chapel Hill; Joseph R. Richart; Cyril E. Sagan, both of Raleigh, all of N.C.

[73] Assignee: EMC Corporation, Hopkinton, Mass.

[21] Appl. No.: 08/858,231

[22] Filed: May 19, 1997

[51] Int. Cl.[7] .................................................. G06F 11/14
[52] U.S. Cl. .......................................................... 711/162
[58] Field of Search ............................. 707/204; 711/161, 711/162, 112, 113, 133, 139, 150, 156, 159, 165

[56] References Cited

U.S. PATENT DOCUMENTS

| | | | |
|---|---|---|---|
| 5,241,668 | 8/1993 | Eastridge et al. | 714/5 |
| 5,241,669 | 8/1993 | Cohn et al. | 714/1 |
| 5,241,670 | 8/1993 | Eastridge et al. | 711/162 |
| 5,263,154 | 11/1993 | Eastridge et al. | 714/6 |
| 5,379,412 | 1/1995 | Eastridge et al. | 711/162 |
| 5,448,718 | 9/1995 | Cohn et al. | 707/204 |
| 5,487,160 | 1/1996 | Bemis | 711/162 |
| 5,535,381 | 7/1996 | Kopper | 711/162 |
| 5,604,862 | 2/1997 | Midgely et al. | 711/161 |
| 5,852,715 | 12/1998 | Raz et al. | 395/200.31 |

FOREIGN PATENT DOCUMENTS

| | | |
|---|---|---|
| 0 332 210 | 9/1989 | European Pat. Off. . |
| WO 93/08529 | 4/1993 | WIPO . |

*Primary Examiner*—Eddie P. Chan
*Assistant Examiner*—Yamir Encarnacion
*Attorney, Agent, or Firm*—Robert L. Dulaney

[57] ABSTRACT

A backup system and method provides for creation of a reconciled snapshot backup image of a database while the database, residing on a disk array system, is in use by users. A backup computer running a commercial backup utility is connected between the array system and a tape storage system. While the backup is underway, write requests to the database are suspended until the data currently in those data blocks is copied and stored in an original data cache. The disk system address of the copied block and a pointer to the location of the block in the cache are stored in a map. The backup utility incrementally reads portions of the database from the disk system and forwards those portions to the tape system. Prior to each portion being forwarded to the tape system, all data blocks in the portion which have an address that corresponds to the address of a block in the cache are discarded and replaced with the data from the cache for that address.

17 Claims, 6 Drawing Sheets

| | 610 | 620 | 630 | 640 |
|---|---|---|---|---|
| ENTRY 1 | UI | UI OFFSET | STATE | ODC OFFSET |
| ENTRY 2 | | | | |
| ... | ... | ... | ... | ... |
| ENTRY N-1 | | | | |
| ENTRY N | | | | |

MODIFIED MAP 245

FIG. 6

APPARATUS AND METHOD FOR BACKUP OF A DISK STORAGE SYSTEM

BACKGROUND OF THE INVENTION

1. Field of the Invention

The present invention relates generally to data backup systems for use with computers and more particularly to an apparatus and method for backing up a storage system to tape while the storage system is in use.

2. Description of the Prior Art

Data processing systems commonly use one or more disk drives for storage of data and programs. The host computer will retrieve from the disk system the particular information currently required and will send to the disk system for storage new or updated information or data or programs which the host may require in the future, but does not require in internal main memory at that time.

Many organizations, such as large businesses and governmental entities, have extremely large databases of information which they need to have readily available for rapid access and modification. These databases may in some circumstances equal or exceed one terabyte of data and require large data storage systems containing multiple disk drives or arrays of disk drives organized into a single large logical memory system. Often there is a host processor, or server, that is dedicated solely or primarily to handling database transactions. The various users of the database transmit their database requests to the database server and receive the requested data from the database server via a network.

Organizations using such large databases typically need to create backups of their databases from time to time for business, legal or archival reasons. Also, while modern disk systems are, in general, highly reliable devices, some organizations may desire to have their database backed up as protection against the possibility of a storage system failure.

It is, therefore, a common practice to periodically perform a backup of part or all of the data on the disk system. Typically this is done by copying onto magnetic tapes the data desired to be backed up. The tapes are then retained for a period of time, as determined by the system user, and can be used to restore the system to a known condition, if necessary.

A number of commercial utility programs are available for performing backup operations. Typically, these utilities are intended to run on the database server. In some cases, the utility can be run on another computer system which communicates with the database server via the LAN. This has drawbacks in that backing up a terabyte database over a LAN would be very slow and, whether the backup utility is running on the backup server or on another computer on the LAN, the participation of the database server during the backup process is required. Involving the database server will divert processing power away from the primary- tasks of the server and may either degrade the response time to system users or lengthen the time required to complete the backup.

Another problem in the prior art is that organizations generally desire a "snapshot" of their database as it exists at a certain point in time. One means of ensuring data consistency during the backup is to restrict users from having access to the data during the backup operation. Since the backup for extremely large databases can sometimes take hours, it is often unacceptable to the organizations for their databases to be unavailable to their users for the duration of the backup.

Prior art systems have been developed in an effort to resolve this problem and allow users to continue to write to the database while the backup is in progress. For example, U.S. Pat. No. 5,535,381 discloses a system wherein a copy-on-write (COW) technique is used to save "original" data to separate buffers prior to execution of a write command. The COW data is stored on the backup tape in separate tape records, so the image stored on the tape is not a duplicate of the original image and requires reintegration to recreate the original data image.

U.S. Pat. No. 5,487,160 discloses another COW technique wherein original data is stored on a spare disk drive until the backup is complete and then the contents of the spare drive is transferred to the backup tape in bulk. Here again, the image on the backup tape is fragmented and requires a reintegration process to reconstitute the original image.

The present invention resolves these problems and drawbacks by allowing users unrestricted access to the system during the backup process while creating a snapshot backup image on tape that does not require reconstruction.

SUMMARY OF THE INVENTION

The present invention relates to a method and apparatus for backing up a database or storage system onto a tape backup system using commercially available backup software utility programs.

It is an object of the invention to create a backup tape containing a snapshop of the database.

It is another object of the invention to allow rapid, consistent backup of the database while users continue to have access.

It is a feature of the invention that a separate backup appliance is used to handle the transfer of the database from the disk system to the tape system.

It is another feature of the invention that blocks of the original database data are stored temporarily and reintegrated into the database image prior to transfer to the backup tape system.

It is an advantage of the invention that standard commercial backup utility programs can be employed.

It is another advantage of the invention that the host processor does not have to participate in the backup.

It is a further advantage that the backup image on tape does not require later reintegration or reconstruction.

Other features and advantages of the present invention will be understood by those of ordinary skill in the art after referring to the detailed description of the preferred embodiment and drawings herein.

BRIEF DESCRIPTION OF THE DRAWINGS

FIG. 6 depicts the organization of MM 245.

DESCRIPTION OF THE PREFERRED EMBODIMENT

The preferred embodiment and method will be discussed in terms of backing up a large database residing in a disk storage system to a tape peripheral. It will be understood by those of ordinary skill in the art that the apparatus and techniques described herein are not limited to database backups, but could readily be adapted to perform a backup of any selected portion of the information in a storage system or to perform a complete backup of all information in storage 130.

Figure 1:
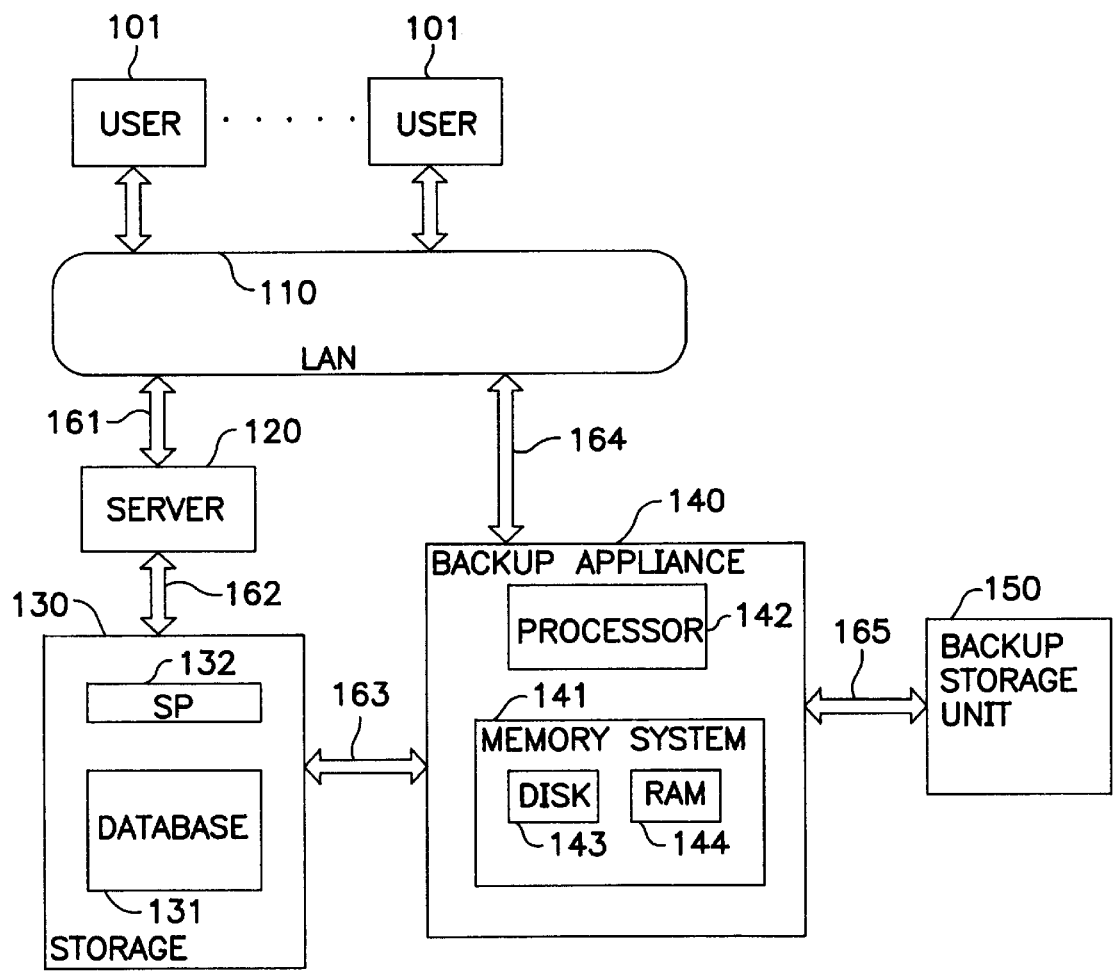
FIG. 1 is a block diagram of a data processing system for performing a backup according to the invention.

Referring to FIG. 1, multiple users 101 are connected to server 120 via local area network 110. Storage 130 communicates with server 120 via bus 162, either SCSI or fibre channel. In a preferred embodiment of a system wherein database 131 is on the order of a terabyte of data, server 120 could be, for example, a Data General AViiON Model 6600 computer running the Microsoft NT operating system and storage 130 could be one or more intelligent RAID disk arrays, for example, Data General CLARiiON disk arrays, organized as a single logical disk storage. Storage 130 contains one or more internal processors, shown collectively in FIG. 1 as storage processor (SP) 132. SP 132 is capable of executing programs and responding to commands from server 120. SP 132 provides the capability for storage 130 to perform tasks, such as copy-on-write discussed below, without the participation of server 120. Storage 130 stores various data and programs, including database 131, used by server 120. Database 131 could be provided by any one of several commercial database vendors, such as Oracle, Microsoft or Informix.

Backup Appliance (BA) 140 is connected to storage 130, Backup Storage Unit (BSU) 150 and LAN 110. BA 140 can be any computer of the users choice that is able to connect to and operate with storage 130, BSU 150 and LAN 110 and has sufficient processing capability to run the backup utility and handle the backup data. Typically, BA 140 can be a smaller computer than server 120, for example a Data General AViiON Model 3600. BA 140 is connected to LAN 110 via a standard network connection 164 and to storage 130 and BSU 150 via SCSI or fibre channel buses 163 and 165. BA 140 can be, but does not have to be, running the same operating system software as server 120.

BA 140 includes processor 142 and memory system 141, comprised of RAM memory 144 and disk drive 143. As will be discussed in detail below, memory system 141 will temporarily store original data blocks from storage 130 and related information. BSU 150 could be any large capacity tape system, for example a Data General DLT Array system.

In the embodiment of FIG. 1, BA 140 will communicate with server 120 via LAN 110 to coordinate preparation for and initiation of the backup process. Immediately prior to initiation of the backup, the database must be placed in a quiescent state by server 120. This typically requires temporarily precluding new database transactions until all pending transactions have concluded and all necessary database information has been written from server 120 to storage 130. This insures that the database is in a stable consistent state. The interruption of normal database processing is typically accomplished quickly and with minimal disruption for the users. As soon as the system is in the quiescent state, the backup can be started and users can be allowed to continue to use the system normally while the backup occurs.

Figure 2:
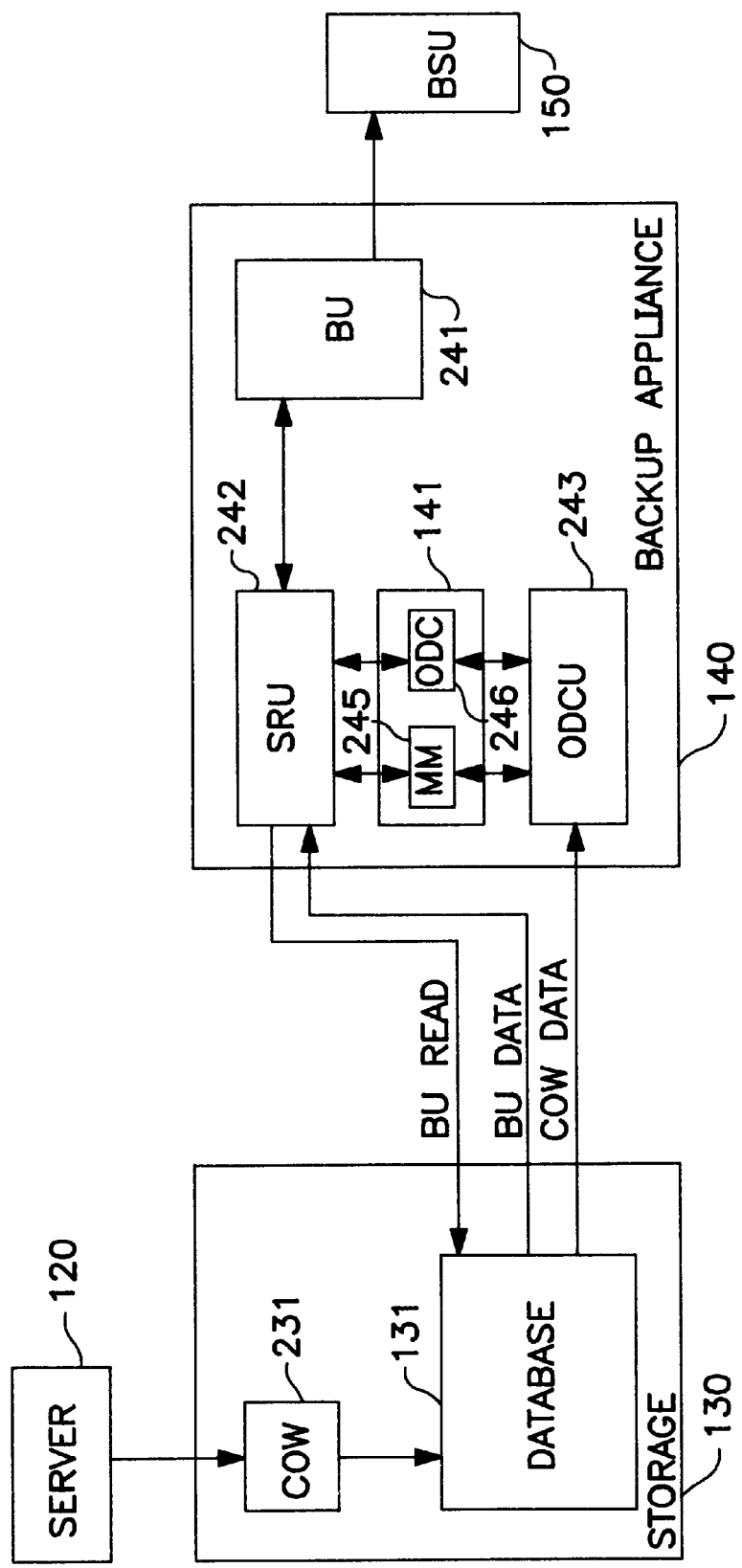
FIG. 2 depicts the functional organization of the data processing system of FIG. 1.

Looking now at FIG. 2, the functional organization of a preferred embodiment of a backup system according to the invention is depicted. Storage 130 contains copy-on-write (COW) program 231 for execution by SP 132 during the backup operation. COW 231 monitors for write commands to storage 130 from server 120 and, if a write command is detected, suspends the execution of the write until a copy is made of the data currently at that memory address in storage 130. In the embodiment of storage 130 described herein, storage 130 data is addressed, copied and moved in blocks of 512 bytes.

Modified Map (MM) 245 and Original Data Cache (ODC) 246 represent areas of memory system 141. In a preferred embodiment, MM 245 and ODC 246 will be files residing on disk drive 143 and MM 245 will be memory mapped to increase access speed. As will be discussed in more detail below, the function of ODC 246 is to temporarily hold blocks of "original data" copied from storage 130 until such time as they are needed to construct the snapshot database image to be stored to BSU 150.

MM 245 will contain one entry for each block stored in ODC 246 during the backup. Transferring the associated block from ODC 246 to BSU 150 or overwriting the block in ODC 246 will not cause the MM 245 entry to be removed. The contents and organization of MM 245 is shown in FIG. 6 and discussed below.

BU 241, Special Read Utility (SRU) 242, and Original Data Cache Utility (ODCU) 243 are programs running on processor 142. BU 241 is a commercial backup utility of the system user's choice, for example, Legato Networker or Cheyenne ARCserver. The operation of SRU 242 and ODCU 243 is transparent to BU 241 and BU 241 need not be modified for use in the disclosed system. BU 241 believes that it is communicating directly with storage 130 and that it is in complete control of the backup.

SRU 242 and ODCU 243 communicate with and control MM 245 and ODC 246. SRU 242 performs the functions of (1) forwarding data read requests from BU 241 to storage 130, (2) receiving the requested data back from storage 130, (3) placing the received data in a RAM 144 buffer while the storage 130 addresses of the received blocks are compared with MM 245 to determine if any data blocks previously read from those addresses are already in ODC 246, (4) if one or more such previously read blocks are present in ODC 246, substituting those blocks from ODC 246 for the blocks currently in the buffer from the same addresses, (5) modifying MM 245 to indicate that those blocks have been transferred to BU 241, and (6) forwarding the contents of the reconciled buffer to BU 241.

In a preferred embodiment, SRU 242 will also filter the write commands from BU 241. Write commands to BA 140 subsystems will be allowed, but attempts by BU 241 to write to storage 130, should any occur, during the backup process will not be allowed.

ODCU 243 performs the functions of (1) monitoring for COW data transfers from storage 130, (2) determining if the COW blocks received from storage 130 are part of the area of storage 130 being backed up, (3) if so, comparing the addresses of each of the received COW blocks with the contents of MM 245 to determine if an entry already exists for any of the received backup blocks, (4) creating an entry in MM 245 for each original COW block received; and (5) storing original COW blocks in ODC 246.

FIG. 6 depicts the functional organization of MM 245. At backup initiation, MM 245 will be empty. Once the backup is started, each write command from server 120 to a data block in storage 130 will cause COW 231 to first copy the existing data from that address and send it as a COW block to ODCU 243. When ODCU 243 receives a COW block from database 131, and the original data from that block is not already in ODC 246, ODCU 243 will create an entry in MM 245 for that block. During the course of the backup, MM 245 will accumulate a plurality of entries 1-N, each entry representing one original data block copied from storage 130 to ODC 246 during the backup. Only the first COW block received from an address will be stored in ODC 246. Subsequent COW blocks with the same address will be ignored by ODCU 243.

Each MM 245 entry 1-N comprises four fields of information. In the embodiment described herein, the storage address of each block in storage 130 is made up of a unique identifier of the specific physical or logical component within storage 130 on which that particular data block resides and an offset to the specific 512 byte block within the component. These two address components are stored in fields 610 and 620 of MM 245 and provide a unique identifier for each block of data in storage 130. Field 630 contains the state of the associated data block. Each block in ODC 246 will be in one of two states: read by BU 241 or not yet read by BU 241. Finally, field 640 contains the offset into ODC 246 where the associated data block is located.

Figure 3:
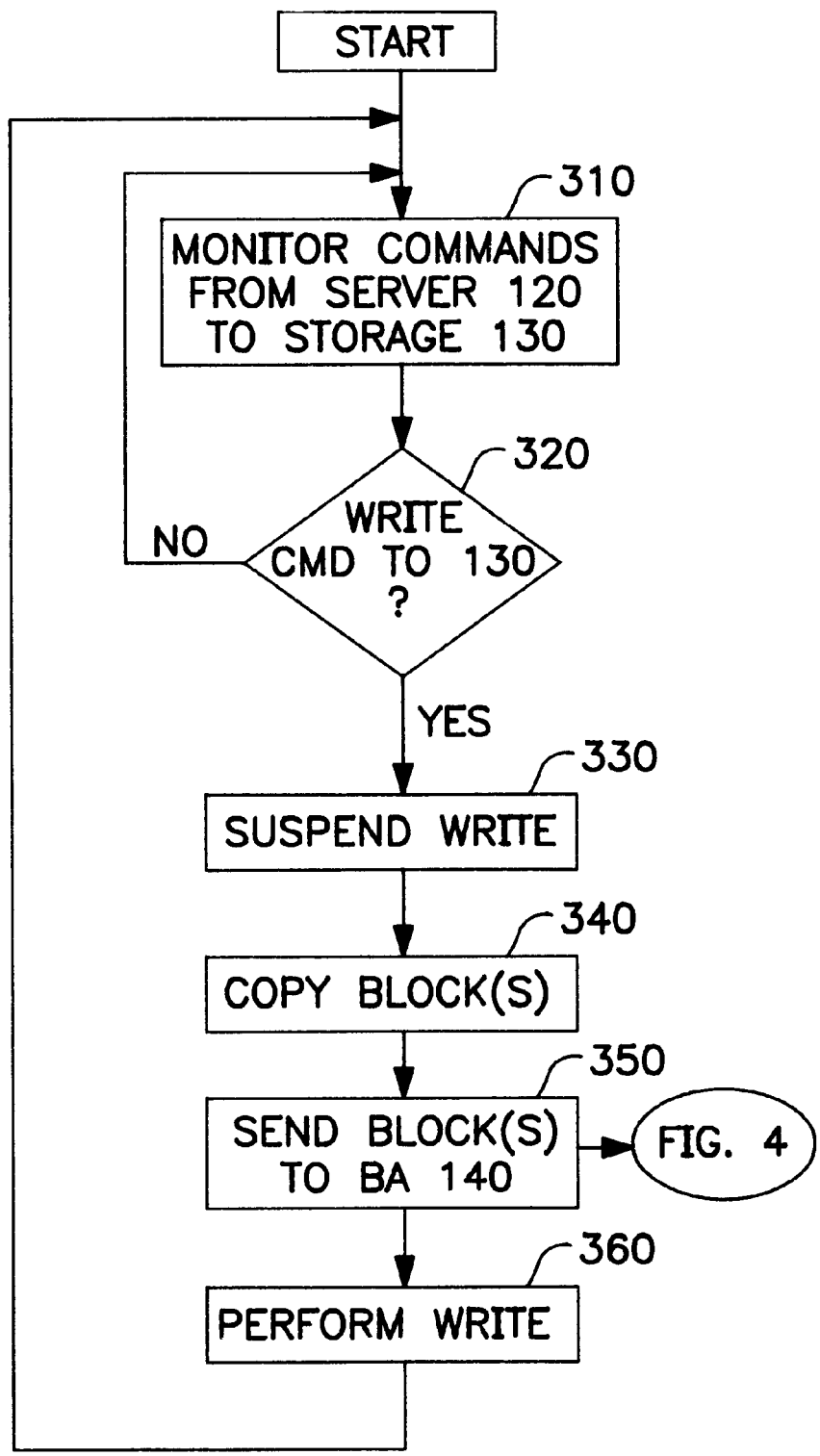
FIG. 3 depicts the flow of COW 231.

Once database 131 is placed in a quiescent condition, the backup operation is initiated. FIG. 3 illustrates the operation of COW 231. At step 310, COW 231 monitors all commands from server 120 to storage 130 to detect write commands. If a write command to storage 130 is detected at step 320, the command is suspended at step 330 and the relevant data is copied at step 340. A write command from server 120 could address a single data block or a number of data blocks. All blocks addressed by the write command are copied at step 340. The copied data block or blocks are sent to BA 140 at step 350. After the block or blocks have been copied, the write command from server 120 can be performed.

As is well understood by those in the art, COW 231 can be designed with additional functionality, if desired, depending on the available processing capacity and memory capacity of SP 132. In the embodiment described herein, a relatively straightforward COW 231 technique is discussed. COW 231 makes a copy of all writes to storage 130 and suspends the entire write until all blocks are copied. In an alternative embodiment, COW 231 could divide a relatively large write request, i.e., a write request affecting a relatively large number of blocks, into a number of smaller incremental writes. COW 231 could then suspend each incremental write only until the portion of the blocks addressed by that incremental write are copied. In another embodiment, COW 231 could maintain a map of the specific addresses to be backed up and only make a copy when writes are intended for those specific memory areas. In yet another alternative embodiment, COW 231 could maintain a table of the addresses of blocks in storage 130 that have already been copied and only perform copy-on-write for those blocks which have not previously been copied during the backup.

Figure 4:
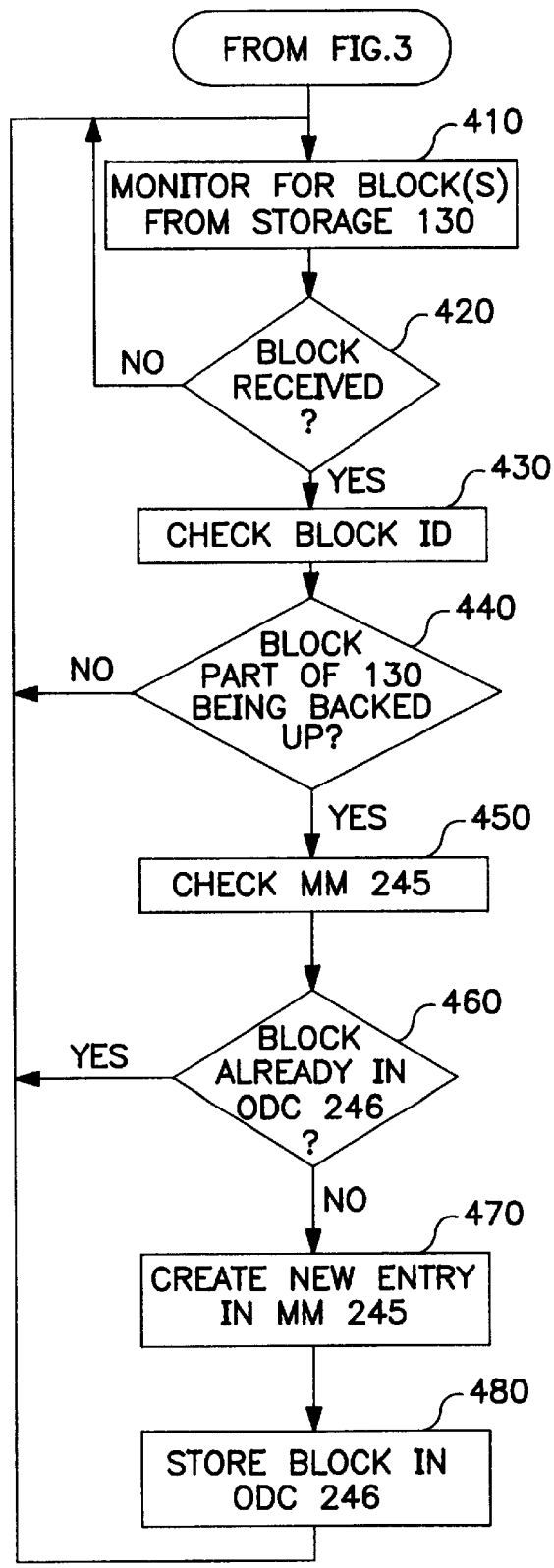
FIG. 4 depicts the flow of ODCU 243.

FIG. 4 illustrates the manner in which ODCU 243 handles the COW blocks sent to BA 140 at step 350. At backup initiation, ODCU 243 initiates step 410 monitoring for COW blocks from storage 130. If one or more blocks are received from storage 130 at step 420, the addresses of the received blocks are checked at step 430 to determine if the received data is part of the portion of storage 130 that is being backed up. If the received data is not part of the area of storage 130 being backed up, the blocks are ignored at step 440 and ODCU 243 continues its monitoring. If the received data is part of the area of storage 130 being backed up, MM 245 is checked to determine if an entry for the unique identifier any of the received blocks already exists in MM 245, meaning that the original data from that block has already been stored in ODC 246. If an entry for a block address already exists in MM 245, then the data just received represents a subsequent write to the same block during the backup. In this case, the received block is ignored and step 410 monitoring continues.

If the address of a received block is not found in MM 245 at step 460, then a new MM 245 entry is created at step 470 for that block. For performing a backup of a single database, it is unnecessary to retain data blocks in ODC 246 after they have been backed up. Therefore, ODCU 243 can reuse the ODC offset of a block that has already been moved to BSU 150, as indicated by state 630, if any such offset is available. If no previously used ODC offset is available, ODCU 243 will assign a new ODC offset. As an alternative embodiment, reuse of ODC offsets can be disallowed, thereby ensuring that each entry in MM 245 is assigned a unique ODC offset during the backup and all ODC data blocks are retained in ODC 246. Finally, the received block is stored in ODC 246 at step 480.

Figure 5:
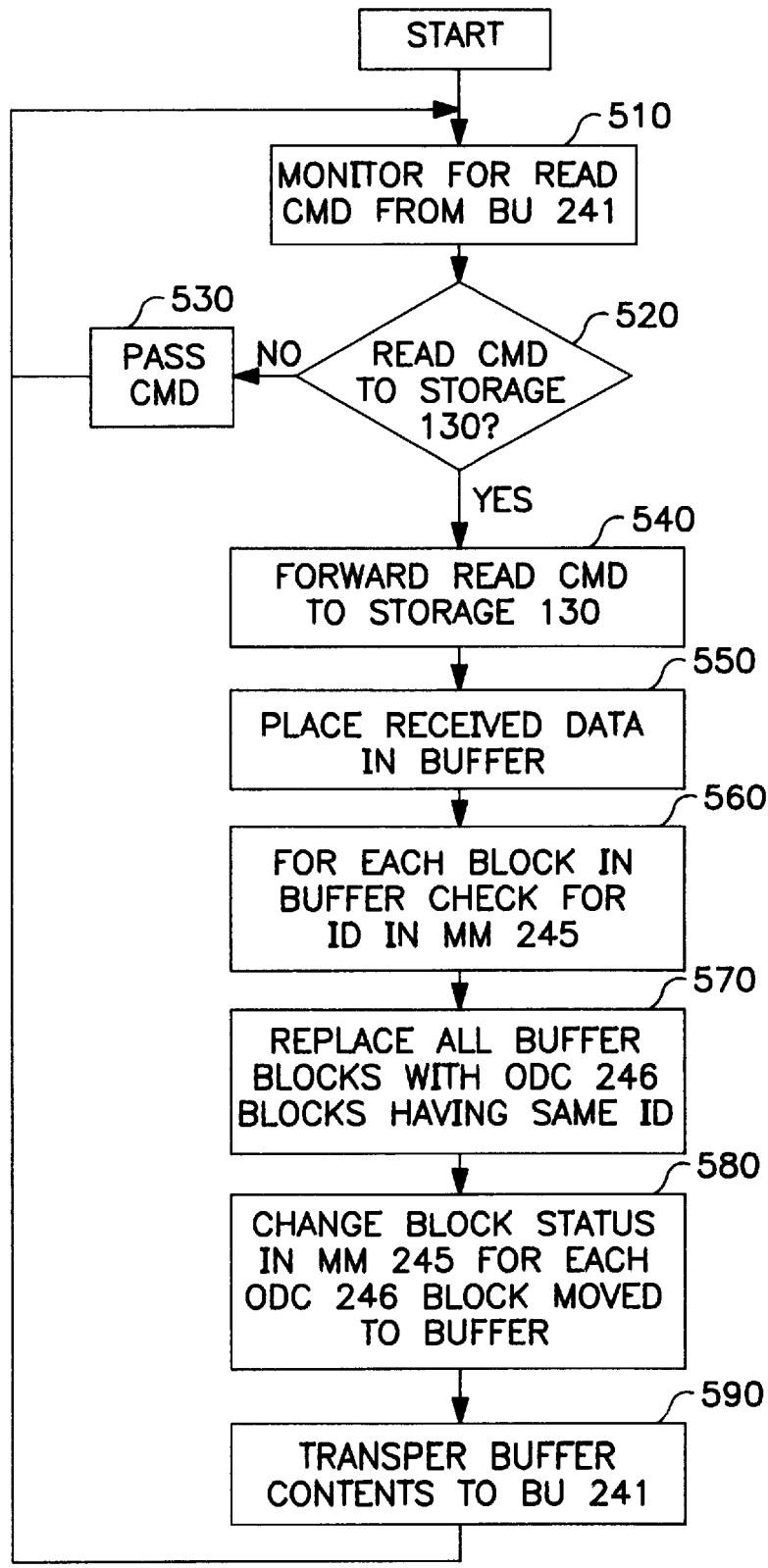
FIG. 5 depicts the flow of SRU 242.

FIG. 5 illustrates the operation of SRU 242. As indicated above, from the viewpoint of BU 241, BU 241 is issuing read commands to storage 130 and receiving back the requested data which it in turn sends to BSU 150. In fact, SRU 242 is interposed between BU 241 and storage 130. At step 510, SRU 242 monitors for read commands from BU 241 to storage 130. Read commands are passed to storage 130 at step 540. If the read is not directed to storage 130, the read command is passed on to its target for execution at step 530. Storage 130 will retrieve the data requested at step 540 and return it to the backup appliance.

The commercial utility employed as BU 241 will generally control and select the specific quantity of data it will request from storage 130 with each read request. As discussed above, in a preferred embodiment, storage 130 uses a 512 byte data block as its standard data unit for manipulation and addressing. Typically, the amount of data read from BU 241 will be substantially larger than 512 bytes. For example, BU 241 might request 64K bytes with each read command. SRU 242 will forward the read request to storage 130 and, when storage returns the requested data, will place the returned quantity of data in a buffer in RAM 144. At this point, some of the data blocks in the buffer may be blocks that were modified after the backup was initiated. To ensure the backup creates a true snapshot, any such modified data blocks in the buffer must be replaced with the corresponding original data blocks from ODC 246 before the requested data is supplied to BU 241.

Therefore, at step 560 the unique address in storage 130 of each block in the buffer is compared with the addresses stored in MM 245 to determine if original data for that address is available in ODC 246. At step 570, each block in the buffer that has an address that matches an address stored in MM245 is discarded and replaced with the original data block from ODC 246. At step 580, the MM 245 state field of each original data block that was placed in the buffer is updated to reflect that the block has been read out of ODC 246 in preparation for being backed up to BSU 150. The change in block status in step 580 acts as an indication to ODCU 243 that the area occupied by that block in ODC 246 can be overwritten and used for storage of another block. At step 590, the contents of the buffer, which now consists only of original data, is forwarded to BU 241 for transfer to BSU 150.

The preferred embodiment described above provides a means of producing a snapshot backup of database 131 using a separate backup appliance that does not require server 120 to participate in the backup process and requires only COW capability from storage 130. It will be understood that, the functions of MM 245 and ODC 246 could be implemented to reside in storage 130 and the SRU 242 and ODCU 243 utilities could be implemented to run on SP 132 instead of processor 142. In this alternative implementation, the storage of COW data blocks and the reconciliation of COW data and data read in response to BU 142 read requests would occur entirely within storage 130. This implementation would reduce the processing demand on processor 142, reduce or remove the requirement for disk 143, and reduce traffic on bus 163, but would have the effects of increasing the workload of SP 132 and requiring storage 130 to accommodate storage of MM 245 and ODC 246.

The particular embodiment above is to be considered in all respects as illustrative and not restrictive. The scope of the invention is indicated by the appended claims rather than by the foregoing description.

We claim:

1. In a data processing system having a host computer connected to a disk peripheral, a backup computer connected to a host computer and the disk peripheral, and a tape peripheral connected to the backup computer, a method for creating a snapshot image of a desired portion of the data residing on the disk peripheral comprising the steps of:

(a) reading a block of the desired portion of the data from the disk peripheral
    (b) determining if a block previously read from the same disk peripheral address as the block read in step (a) is available in an original data cache;
    (c) if step (b) is affirmative, transferring the previously read block of data to the tape peripheral;
    (d) if step (b) is not affirmative, transferring the block of data read in step (a) to the tape peripheral; and
    (e) repeating steps (a)–(d) until the entire desired portion has been transferred to the tape peripheral.

2. In a data processing system having a host computer connected to a disk peripheral, a backup computer connected to the host computer and the disk peripheral and a tape peripheral connected to the backup computer, a method for creating a snapshot image of a desired portion of the data residing on the disk peripheral comprising the steps of:

(a) reading a plurality of blocks of the desired data from the disk peripheral;
    (b) placing the plurality of blocks in a buffer;
    (c) for each block placed in the buffer in step (b), performing the steps of:
        determining if a block of data previously read from the same disk peripheral address is available in an original data cache; and
        if so, replacing the block of data currently in the buffer with the previously read block of data;
    (d) transferring the contents of the buffer to the tape peripheral;
    (e) repeating steps (a)–(d) until the desired portion has been transferred from the disk peripheral to the tape peripheral.

3. In a data processing system having a host computer connected to an disk peripheral, a backup computer connected to the host computer and the disk peripheral and a tape peripheral connected to the backup computer, a method for creating a snapshot image of a desired portion of the data residing on the disk peripheral comprising the steps of:

(a) monitoring for a write command from the host computer to the disk peripheral;
    (b) if a write command is detected, performing the steps of:
        (i) suspending the write command,
        (ii) copying the data from the disk peripheral addresses to which the write command is directed,
        (iii) storing the data copied at step (ii) in an original data cache, and
        (iv) executing the write;
    (c) reading at least one block of the desired data from the disk peripheral;
    (d) for each block read in step (c), performing the steps of:
        determining if a block of data previously read from the same disk peripheral address is available in the original data cache; and
        if so, transferring the previously read block of data to the tape peripheral;
        if not, transferring the block of data read in step (c) to the tape peripheral
    (e) repeating steps (a)–(d) until the desired portion of data has been transferred from the disk peripheral to the tape peripheral.

4. In a data processing system having a host computer, a disk peripheral having copy-on-write capability and connected to the host computer, and a backup computer connected to the host computer and the disk peripheral, a copy-on-write method comprising the steps of:

(a) monitoring for a write command from the host computer to the disk peripheral
    (b) if a write command is detected, performing the steps of:
        (i) suspending the write command,
        (ii) copying the data from the addresses to which the write command is directed,
        (iii) for each data block copied in step (ii), performing the steps of:
            (1) comparing the address of the block with a list of addresses of blocks previously stored in an original data cache;
            (2) if the address of the block is on the list, discarding the block;
            (3) if the address of the block is not on the list, storing the block in the original data cache and adding the address of the block to the list; and
        (iv) executing the write.

5. The method of claim 4 wherein step b(iii) (3) includes the additional step of storing a pointer to the location of the block in the backup computer.

6. The method of claim 4 wherein step b(iii) (3) includes the additional step of storing a state indicator for the block, said state indicator indicating whether the block has been read from the backup computer.

7. A backup system for use with a data processing system having a disk peripheral with copy-on-write capability and a host computer connected to the disk peripheral, said backup system comprising:

a tape peripheral for storing a backup copy of at least a portion of the information on the disk peripheral; and
    a backup computer, connected to the disk peripheral and the tape peripheral, the backup computer having
        means for receiving copy-on-write data from the disk peripheral,
        means for storing the copy-on-write data in the backup computer,
        means for requesting backup data from the disk peripheral,
        means for receiving backup data from the disk peripheral in response to a request,
        means for transferring data to the tape peripheral; and
        means for selecting either the received backup data or the stored copy-on-write data to be transferred to the tape peripheral.

8. A backup computer system for use with a tape peripheral, a disk peripheral having copy-on-write capability and a host computer connected to the disk peripheral, the backup computer system comprising:
- a backup computer, connected to the disk peripheral and the tape peripheral, the backup computer having
  - means for receiving copy-on-write data from the disk peripheral,
  - means for storing the copy-on-write data in the backup computer,
  - means for requesting backup data from the disk peripheral,
  - means for receiving backup data from the disk peripheral in response to a request,
  - means for transferring data to the tape peripheral; and
  - means for selecting either the received backup data or the stored copy-on-write data to be transferred to the tape peripheral.

9. A data storage and backup system for use with a host computer, said system comprising:
- a disk peripheral connected to the host computer and having copy-on-write capability;
- a tape peripheral for storing a backup copy of at least a portion of the information on the disk peripheral;
- a backup computer, connected to the disk peripheral and the tape peripheral, the backup computer having
  - means for receiving copy-on-write data from the disk peripheral,
  - means for storing the copy-on-write data in the backup computer,
  - means for requesting backup data from the disk peripheral,
  - means for receiving backup data from the disk peripheral in response to a request,
  - means for transferring data to the tape peripheral, and
  - means for selecting either the received backup data or the stored copy-on-write data to be transferred to the tape peripheral.

10. A backup system for use with a tape peripheral, a disk peripheral with copy-on-write capability and a host computer connected to the disk peripheral, the backup system comprising:
- a processor for executing utility programs;
- data storage means;
- an original data cache in the data storage means;
- a data cache utility having means for receiving copy-on-write (COW) data from the disk peripheral and means for storing the COW data in the original data cache;
- a backup utility having means for issuing read commands to the disk peripheral, means for receiving data from the disk peripheral and means sending data to the tape peripheral; and
- a read utility having means for receiving data from the disk peripheral in response to a read command from the backup utility, means for comparing the disk peripheral address of received data with disk peripheral addresses of COW data, means for providing data to the backup utility, and means for selecting the data to be provided to the backup utility from either the data received from the disk peripheral or the COW data stored in the original data cache.

11. A data processing system comprising:
- a host computer;
- a disk peripheral connected to the host computer and having an internal processor;
- a tape peripheral;
- a backup computer, connected to the disk peripheral and the tape peripheral, for making a snapshot copy on the tape peripheral of at least a portion of the data on the disk peripheral while the host computer continues to have access to the data on the disk peripheral, the backup computer including
  - an original data cache;
  - a data cache utility having means for receiving copy-on-write (COW) data from the disk peripheral and means for storing the COW data in the original data cache;
  - a backup utility having means for receiving data commands to the disk peripheral, means for receiving data from the disk peripheral and means for sending data to the tape peripheral; and
  - a read utility having means for receiving data from the disk peripheral in response to a read command from the backup utility; means for comparing the disk peripheral address of the received data with disk peripheral addresses of COW data; means for providing data to the backup utility; and means for selecting the data to be provided to the backup utility form either the data received from the disk peripheral and the COW data stored in the original data cache.

12. The system of claim 10 or 11 wherein the backup computer further comprises:
- a map of the original data cache;
- means for storing in the map the disk peripheral address of the COW data in the map; and
- means for assigning and storing in the map a pointer to the COW data in the original data cache
- means for checking the map for stored addresses matching the addresses of data received from the disk peripheral.

13. The data processing system of claim 12, wherein, for each address requested by the backup utility, the means for selecting selects the received data if no corresponding address if found in the map and selects the original data cache data if a corresponding address is found in the map.

14. The apparatus of claim 12 wherein the data cache utility further includes means for checking the map prior to storing COW data in the original data cache and storing the data in the original data cache only if the map indicates that data from the same disk peripheral address is not already stored in the original data cache.

15. The apparatus of claim 13 wherein the data cache utility further includes means for storing a state field in the map for each COW entry, said state field indicating that the corresponding COW data in the original data cache either has been or has not been selected by the read utility selecting means.

16. The apparatus of claim 15 wherein the read utility further includes means for modifying the contents of the state field when the read utility selects the COW data associated with that state field from the original data cache.

17. The apparatus of claim 12 wherein the means for assigning the pointer includes means for reassigning a previously assigned pointer if the state field associated with the previously assigned pointer indicates that the COW data associated with that pointer has been selected by the read utility selecting means.

* * * * *